(12) United States Patent
Adl et al.

(10) Patent No.: US 11,863,221 B1
(45) Date of Patent: Jan. 2, 2024

(54) LOW SIZE, WEIGHT AND POWER (SWAP) EFFICIENT HARDWARE IMPLEMENTATION OF A WIDE INSTANTANEOUS BANDWIDTH NEUROMORPHIC ADAPTIVE CORE (NEURACORE)

(71) Applicant: HRL Laboratories, LLC, Malibu, CA (US)

(72) Inventors: Sanaz Adl, Thousand Oaks, CA (US); Peter Petre, Oak Park, CA (US); Gabriel L. Virbila, Venice, CA (US); Austin F. Garrido, Northridge, CA (US); Bryan H. Fong, Los Angeles, CA (US); Adour V. Kabakian, Monterey Park, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 95 days.

(21) Appl. No.: 17/375,724

(22) Filed: Jul. 14, 2021

Related U.S. Application Data

(60) Provisional application No. 63/051,877, filed on Jul. 14, 2020, provisional application No. 63/051,851, filed on Jul. 14, 2020.

(51) Int. Cl.
*H04B 1/12* (2006.01)
*G06N 3/08* (2023.01)

(52) U.S. Cl.
CPC ............... *H04B 1/123* (2013.01); *G06N 3/08* (2013.01)

(58) Field of Classification Search
CPC .................................. H04B 1/123; G06N 3/08
See application file for complete search history.

(56) References Cited

U.S. PATENT DOCUMENTS 5,694,474 A  12/1997 Ngo
7,474,756 B2  1/2009 Ricard et al.
(Continued)

FOREIGN PATENT DOCUMENTS

CN  106875002 A  *  6/2017  ............... G06N 3/02
CN  105075156 B  *  1/2018  ............. G06N 3/063
(Continued)

OTHER PUBLICATIONS

A. Irmanova, O. Krestinskaya and A. P. James, "Neuromorphic Adaptive Edge-Preserving Denoising Filter," 2017 IEEE International Conference on Rebooting Computing (ICRC), 2017, pp. 1-6, doi: 10.1109/ICRC.2017.8123644. (Year: 2017).*
(Continued)

*Primary Examiner* — Berhanu Tadese
(74) *Attorney, Agent, or Firm* — TOPE-MCKAY & ASSOCIATES

(57) ABSTRACT

Described is a Neuromorphic Adaptive Core (NeurACore) cognitive signal processor (CSP) for wide instantaneous bandwidth denoising of noisy signals. The NeurACore CSP includes a NeurACore block, a globally learning layer, and a neural combiner. The NeurACore block is operable for receiving as an input a mixture of in-phase and quadrature (I/Q) signals and mapping the I/Q signals onto a neural network to determine complex-valued output weights of neural states of the neural network. The global learning layer is operable for adapting the complex-valued output weights to predict a most likely next value of the input I/Q signal. Further, the neural combiner is operable for combining a set of delayed neural state vectors with the weights of the global learning layer to compute an output signal, the output signal being separate in-phase and quadrature signals.

13 Claims, 11 Drawing Sheets

(56) References Cited

U.S. PATENT DOCUMENTS

| | | | |
|---|---|---|---|
| 8,031,117 B2 | 10/2011 | Goldberg | |
| 9,042,496 B1 | 5/2015 | Su et al. | |
| 9,349,092 B2* | 5/2016 | Thibeault | G06N 20/00 |
| 9,515,789 B2* | 12/2016 | Zhang | H04L 27/26538 |
| 9,646,248 B1* | 5/2017 | Benvenuto | G06N 5/022 |
| 9,753,959 B2* | 9/2017 | Birdwell | G06N 3/10 |
| 9,798,751 B2* | 10/2017 | Birdwell | G06N 3/10 |
| 9,954,561 B2* | 4/2018 | Ray | H04B 1/1638 |
| 10,019,470 B2* | 7/2018 | Birdwell | G06N 3/049 |
| 10,055,434 B2* | 8/2018 | Birdwell | G06N 3/049 |
| 10,095,718 B2* | 10/2018 | Birdwell | G06N 3/10 |
| 10,128,820 B2* | 11/2018 | Petre | G06N 3/065 |
| 10,153,806 B1* | 12/2018 | Petre | G06N 3/08 |
| 10,162,378 B1* | 12/2018 | Rao | G06F 1/08 |
| 10,192,099 B2* | 1/2019 | Agaian | G06V 20/69 |
| 10,198,691 B2* | 2/2019 | Nino | G06N 3/049 |
| 10,217,047 B2* | 2/2019 | O'Shea | H04L 1/0001 |
| 10,248,675 B2* | 4/2019 | Birdwell | G06N 3/065 |
| 10,305,553 B2* | 5/2019 | O'Shea | G06N 3/08 |
| 10,310,074 B1* | 6/2019 | Ni | G01S 13/9019 |
| 10,341,669 B2* | 7/2019 | Lin | G06N 3/049 |
| 10,346,739 B1* | 7/2019 | Dockendorf | G06F 18/2134 |
| 10,380,062 B1* | 8/2019 | Rao | G06F 18/2134 |
| 10,396,919 B1* | 8/2019 | O'Shea | H04L 25/0254 |
| 10,404,299 B1* | 9/2019 | Petre | H04B 1/10 |
| 10,429,491 B2* | 10/2019 | Ray | G01S 7/021 |
| 10,529,320 B2* | 1/2020 | Shafran | G10L 19/0212 |
| 10,541,765 B1* | 1/2020 | O'Shea | H04B 17/373 |
| 10,572,830 B2* | 2/2020 | O'Shea | G06N 3/086 |
| 10,614,358 B2* | 4/2020 | Nino | G06N 3/049 |
| 10,643,153 B2* | 5/2020 | O'Shea | H04W 24/08 |
| 10,712,416 B1* | 7/2020 | Sandino | G06N 3/045 |
| 10,712,425 B1* | 7/2020 | Rao | G01S 7/354 |
| 10,720,949 B1* | 7/2020 | Rao | G06N 3/08 |
| 10,846,595 B2* | 11/2020 | Wild | G06N 3/088 |
| 10,892,806 B2* | 1/2021 | O'Shea | H04B 7/0413 |
| 10,929,745 B2* | 2/2021 | Birdwell | G06N 3/086 |
| 10,951,982 B2* | 3/2021 | Hayakawa | H04R 3/005 |
| 11,032,014 B2* | 6/2021 | O'Shea | H04L 25/03165 |
| 11,037,057 B1* | 6/2021 | Virbila | H04B 1/719 |
| 11,055,614 B2* | 7/2021 | Nino | G06N 3/049 |
| 11,256,988 B1* | 2/2022 | Guerci | G06N 3/08 |
| 11,282,505 B2* | 3/2022 | Hayakawa | G06N 3/045 |
| 11,366,998 B2* | 6/2022 | Pugsley | G06N 3/063 |
| 11,366,999 B2* | 6/2022 | Yamamoto | G06N 3/04 |
| 11,381,286 B2* | 7/2022 | O'Shea | H04B 7/0413 |
| 11,392,830 B2* | 7/2022 | Ozcan | G03H 1/0244 |
| 11,403,479 B2* | 8/2022 | Cao | G06T 9/00 |
| 11,423,301 B2* | 8/2022 | O'Shea | H04L 1/0001 |
| 11,514,325 B2* | 11/2022 | Ozcan | G06V 10/82 |
| 11,580,381 B2* | 2/2023 | Daval Frerot | G06N 20/00 |
| 11,614,514 B2* | 3/2023 | Chen | G01S 7/40 342/70 |
| 11,632,181 B2* | 4/2023 | O'Shea | G06N 3/08 706/12 |
| 2005/0047611 A1 | 3/2005 | Mao | |
| 2010/0158271 A1 | 6/2010 | Park et al. | |
| 2012/0232418 A1 | 9/2012 | Kimura | |
| 2014/0241211 A1* | 8/2014 | Zhang | H04L 27/26414 370/255 |
| 2015/0302296 A1* | 10/2015 | Thibeault | G06N 3/08 706/25 |
| 2016/0132768 A1* | 5/2016 | Ray | G06N 3/08 706/22 |
| 2016/0203827 A1 | 7/2016 | Leff | |
| 2018/0076795 A1* | 3/2018 | Petre | H04B 1/719 |
| 2018/0096246 A1* | 4/2018 | Yamamoto | G06N 3/08 |
| 2018/0174042 A1* | 6/2018 | Srinivasa | G06N 3/088 |
| 2018/0308013 A1* | 10/2018 | O'Shea | G06N 20/00 |
| 2019/0042915 A1* | 2/2019 | Akin | G06N 3/065 |
| 2019/0042916 A1* | 2/2019 | Cao | G06N 3/08 |
| 2019/0042920 A1* | 2/2019 | Akin | G06N 3/049 |
| 2019/0042942 A1* | 2/2019 | Natroshvili | G06N 3/049 |
| 2019/0188565 A1* | 6/2019 | O'Shea | H04L 1/0001 |
| 2019/0251421 A1* | 8/2019 | Wang | G06N 3/08 |
| 2019/0349037 A1* | 11/2019 | O'Shea | G06N 3/08 |
| 2020/0042873 A1* | 2/2020 | Daval Frerot | G06N 20/00 |
| 2020/0066260 A1* | 2/2020 | Hayakawa | G10L 15/22 |
| 2020/0111483 A1* | 4/2020 | Shafran | G06N 3/02 |
| 2020/0218959 A1* | 7/2020 | Srinivasa | G06N 3/08 |
| 2020/0218977 A1* | 7/2020 | Paul | G06N 3/088 |
| 2020/0225317 A1* | 7/2020 | Chen | G01S 7/417 |
| 2020/0265290 A1* | 8/2020 | Paul | G06N 5/01 |
| 2020/0265338 A1* | 8/2020 | O'Shea | G06N 20/00 |
| 2020/0272883 A1* | 8/2020 | Cao | G06N 3/006 |
| 2020/0272884 A1* | 8/2020 | Paul | G06N 3/049 |
| 2020/0334575 A1* | 10/2020 | O'Shea | G06N 3/045 |
| 2020/0341109 A1* | 10/2020 | Meissner | G01S 7/023 |
| 2020/0342321 A1* | 10/2020 | Paul | G06N 3/049 |
| 2021/0209453 A1* | 7/2021 | Meissner | G01S 7/417 |
| 2021/0357737 A1* | 11/2021 | Hamerly | G06N 3/048 |
| 2021/0357742 A1* | 11/2021 | Restuccia | G06N 3/063 |
| 2021/0367690 A1* | 11/2021 | O'Shea | G06N 20/00 |
| 2022/0198245 A1* | 6/2022 | Cleland | G06N 3/049 |
| 2022/0200669 A1* | 6/2022 | Banuli Nanje Gowda | G06F 9/466 |
| 2022/0217035 A1* | 7/2022 | Melodia | G06N 3/063 |
| 2022/0222513 A1* | 7/2022 | Paramasivam | G06F 1/3237 |

FOREIGN PATENT DOCUMENTS

| | | | | |
|---|---|---|---|---|
| CN | 110088635 A | * | 8/2019 | G01S 7/414 |
| CN | 110728324 A | * | 1/2020 | G06K 9/6256 |
| CN | 111541466 B | * | 3/2021 | |
| CN | 110301143 B | * | 4/2022 | H04W 12/06 |
| CN | 110088635 B | * | 9/2022 | G01S 7/414 |
| DE | 102019106529 A1 | * | 9/2020 | G01S 13/02 |
| DE | 102021132995 A1 | * | 6/2022 | G06F 17/16 |
| JP | 2018077213 A | * | 5/2018 | G01S 13/06 |
| JP | 2018091826 A | * | 6/2018 | G01S 13/66 |
| JP | 2019090795 A | * | 6/2019 | G01S 13/003 |
| JP | 6758524 B2 | * | 9/2020 | G06N 3/0445 |
| JP | 7049085 B2 | * | 4/2022 | G01S 13/06 |
| JP | 7163011 B2 | * | 10/2022 | G01S 13/66 |
| WO | WO-2018136144 A1 | * | 7/2018 | G01S 7/414 |
| WO | WO-2018200529 A1 | * | 11/2018 | G06N 3/0454 |
| WO | WO-2018204632 A1 | * | 11/2018 | G06N 3/0445 |
| WO | WO-2018236932 A1 | * | 12/2018 | G06N 3/006 |
| WO | WO-2019200289 A1 | * | 10/2019 | G02B 27/4205 |
| WO | WO-2020102204 A1 | * | 5/2020 | G06N 3/04 |
| WO | WO-2020210673 A1 | * | 10/2020 | G06N 3/0445 |
| WO | WO-2020236236 A2 | * | 11/2020 | G06N 3/04 |
| WO | WO-2020236236 A3 | * | 12/2020 | G06N 3/04 |
| WO | WO-2020236236 A9 | * | 2/2021 | G06N 3/04 |

OTHER PUBLICATIONS

Dai et al, Classification of IQ-Modulated Signals Based on Reservoir Computing With Narrowband Optoelectronic Oscillators, IEEE 2021 (Year: 2021).*

Benjamin et al. Neurogrid—A Mixed-Analog-Digital Multichip System for Large-Scale Neural Simulation, IEEE 2014 (Year: 2014).*

Neuromorphic Computing with Intel's Loihi 2 chip—Technology Brief, 2021 (Year: 2021).*

S. Choi, A. Cichocki, H.-M. Park, and S.-Y. Lee, "Blind Source Separation and Independent Component Analysis: A Review," Neural Information Processing—Letters, vol. 6, No. 1, Jan. 2005, pp. 1-57.

A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.

A. Hyvarinen, "Complexity Pursuit: Separating Interesting Components from Time Series," Neural Computation, vol. 13, No. 4, pp. 883-898, Apr. 2001.

Igel, C. and Husken, M., "Improving the Rprop learning algorithm", in Proc. of the 2nd Int. Symposium on Neural Computation (NC'2000), pp. 115-121, ICSC Academic Press, 2000.

(56) References Cited

OTHER PUBLICATIONS

R. Legenstein, et al. "Edge of Chaos and Prediction of Computational Performance for Neural Microcircuit Models," Neural Networks, 20(3), pp. 323-334, 2007.
W. Maass, "Liquid Computing", Proc. of the Conference CiE'07: Computability in Europe 2007, Siena (Italy), pp. 507-516.
F. Takens, "Detecting Strange Attractors in Turbulence," Dynamical Systems and Turbulence, Lecture Notes in Mathematics vol. 898, 1981, pp. 366-381.
D. Verstraeten, et al. "An experimental unification of reservoir computing methods", Neural Networks, vol. 20, No. 3, Apr. 2007, pp. 391-403.
R. H. Walden, "Analog-to-digital converter survey and analysis," IEEE J. Sel. Areas Commun., vol. 51, pp. 539-548, 1999.
H. Yap, et al., "A First Analysis of the Stability of Takens' Embedding," in Proc. of the IEEE Global Conference on Signal and Information Processing (GlobalSIP) symposium on Information Processing for Big Data, Dec. 2014, pp. 404-408.
Office Action 1 for U.S. Appl. No. 15/817,906, dated Feb. 23, 2018.
Response to Office Action 1 for U.S. Appl. No. 15/817,906, dated May 23, 2018.
Notice of Allowance for U.S. Appl. No. 15/817,906, dated Jul. 6, 2018.
Notification of Transmittal of International Search Report and the Written Opinion of the International Searching Authority for PCT/US2017/062561; dated Feb. 6, 2018.
International Search Report of the International Searching Authority for PCT/US2017/062561; dated Feb. 6, 2018.
Written Opinion of the International Searching Authority for PCT/US2017/062561; dated Feb. 6, 2018.
Notification of International Preliminary Report on Patentability (Chapter I) for PCT/US2017/062561; dated Aug. 1, 2019.
International Preliminary Report on Patentability (Chapter I) for PCT/US2017/062561; dated Aug. 1, 2019.
M. Lukosevicius, H. Jaeger: "Reservoir computing approaches to recurrent neural network training", Computer Science Review (2009), Computer Science Review 3 ( 2009 ) pp. 127-149.
Jing Dai, et al.: "An Introduction to the Echo State Network and its Applications in Power System", 2009 15th International Conference on Intelligent System Applications to Power Systems, IEEE, pp. 1-7.
Pathak et al., entitled, "Hybrid forecasting of chaotic processes: Using machine learning in conjunction with a knowledge-based model," arXiv:1803.04779, 2018, pp. 1-9.
Office Action 1 for Chinese Patent Application No. 201780078246.2, dated Dec. 3, 2020.
English translation of Office Action 1 for Chinese Patent Application No. 201780078246.2, dated Dec. 3, 2020.
Andrius Petrenas, "Reservoir Computing for Extraction of Low Amplitude Atrial Activity in Atrial Fibrillation", Computing in Cardiology(CINC), pp. 13-16.
Response to Office Action 1 for Chinese Patent Application No. 201780078246.2, Date filed Apr. 14, 2021.
English translation of amended claims in Response to Office Action 1 for Chinese Patent Application No. 201780078246.2, Date filed Apr. 14, 2021.
Office Action 2 for Chinese Patent Application No. 201780078246.2, dated Jul. 21, 2021.
English translation of Office Action 2 for Chinese Patent Application No. 201780078246.2, dated Jul. 21, 2021.
Response to Office Action 2 for Chinese Patent Application No. 201780078246.2, Date filed Sep. 13, 2021.
English translation of amended claims in Response to Office Action 2 for Chinese Patent Application No. 201780078246.2, Date filed Sep. 13, 2021.
Decision of Rejection for Chinese Patent Application No. 201780078246.2, dated Jan. 4, 2022.
Request for Reexamination for Chinese Patent Application No. 201780078246.2, Filed Mar. 30, 2022.
English translation of amended claims in Request for Reexamination for Chinese Patent Application No. 201780078246.2, Date filed Mar. 30, 2022.
Reexamination Decision for Chinese Patent Application No. 201780078246.2, dated May 6, 2022.
Amendment for Chinese Patent Application No. 201780078246.2, dated Jun. 20, 2022.
English translation of amended claims in Amendment for Chinese Patent Application No. 201780078246.2, Date filed Jun. 20, 2022.
Notice of Allowance for Chinese Patent Application No. 201780078246.2, Date filed Jul. 5, 2022.
English translation of Notice of Allowance for Chinese Patent Application No. 201780078246.2, Date filed Jul. 5, 2022.
Patent Certificate for Chinese Patent No. CN 110088635 B, Dated Sep. 20, 2022.
English translation of the Patent Certificate for Chinese Patent No. CN 110088635 B, Dated Sep. 20, 2022.
Communication pursuant to Rules 161 (2) and 162 EPC for European Regional Phase Patent Application No. 17892664.8, dated Aug. 27, 2019.
Response to the communication pursuant to Rules 161(2) and 162 EPC for European Regional Phase Patent Application No. 17892664.8, dated Mar. 6, 2020.
Communication pursuant to Rules 70(2) and 70a(2) EPC (the supplementary European search report) for the European Regional Phase Patent Application No. 17892664.8, dated Oct. 22, 2020.
Andrius Petrenas, et al, "Reservoir computing for extraction of low amplitude atrial activity in atrial fibrillation," Computing in Cardiology (CINC). 2012. IEEE. Sep. 9, 2012 (Sep. 9, 2012). pp. 13-16. XP032317043. ISBN: 978-1-4673-2076-4.
Ali Deihimi, et al, "Application of echo state network for harmonic detection in distribution networks," IET Generation. Transmission &Distribution. vol. 11. No. 5. Dec. 21, 2016 (Dec. 21, 2016). pp. 1094-1101. XP055733455.
Herbert Jaeger, "Controlling Recurrent Neural Networks by Conceptors," Technical Report No. 31, Jul. 22, 2016 (Jul. 22, 2016). XP055732541 , Retrieved from the Internet: URL:https:jjarxiv.orgjpdf/1 403.3369v2. pdf [retrieved on Sep. 21, 2020].
Ozturk, et al, "An associative memory readout for ESNs with applications to dynamical pattern recognition," Neural Networks. Elsevier Science Publishers. Barking. GB. vol. 20. No. 3. Jun. 5, 2007 (Jun. 5, 2007). pp. 377-390. XP022104570.
Response to the communication pursuant to Rules 70(2) and 70a(2) EPC (the supplementary European search report) for the European Regional Phase Patent Application No. 17892664.8, dated Apr. 22, 2021.

* cited by examiner

LOW SIZE, WEIGHT AND POWER (SWAP) EFFICIENT HARDWARE IMPLEMENTATION OF A WIDE INSTANTANEOUS BANDWIDTH NEUROMORPHIC ADAPTIVE CORE (NEURACORE)

CROSS-REFERENCE TO RELATED APPLICATIONS

This application claims the benefit of and is a non-provisional patent application of U.S. 63/051,877, filed on Jul. 14, 2020, the entirety of which is hereby incorporated by reference.

This application ALSO claims the benefit of and is a non-provisional patent application of U.S. 63/051,851, filed on Jul. 14, 2020, the entirety of which is hereby incorporated by reference.

BACKGROUND OF INVENTION

(1) Field of Invention

The present invention relates to signal processor and, more specifically, to a cognitive signal processor (CSP) formed as an efficient hardware implementation with a wide instantaneous bandwidth neuromorphic adaptive core (NeurACore).

(2) Description of Related Art

Reservoir type computers, or reservoir computing, is a computation framework that uses a recurrent neural network to map input signals into higher dimensional spaces through the dynamics of a fixed, non-linear reservoir. A problem with such existing reservoir computing technologies is that they employ a reservoir with fixed core weights that do not adapt to new situations. Another existing problem with the prior art is that the learning output layer can handle only real-valued signals, meaning that they are incapable of handling handle complex-valued I/Q signals while preserving their phase coherence. Since I/Q signals are commonly encountered in communication and radar signal processing, existing reservoir computing technologies are not well suited for such applications. Further, since existing reservoir systems have fixed core weights, they require a lot of cores to detect/sense and separate signals, also rendering them generally unsuitable for communication and radar signal processing.

One recent patent for wideband signal denoising is described in U.S. Pat. No. 10,128,820 (the '820 Patent), the entirety of which is incorporated herein by reference. While somewhat relevant to the present disclosure, the '820 uses a fixed reservoir with no embedded physics and no neuromorphic adaptive cores.

Reservoir computing was described in further detail by M. Lukosevicius and H. Jaeger, in "Reservoir computing approaches to recurrent neural network training", Computer Science Review (2009), doi:10.1016/j.cosrev.2009.03.005, the entirety of which is incorporated herein by reference. Further discussion of using reservoir computers was provided by Jing Dai, et al., in "An Introduction to the Echo State Network and its Applications in Power System", 2009 15th International Conference on Intelligent System Applications to Power Systems, the entirety of which is incorporated herein by reference. While related to reservoir computing, both papers describe using a gradient descent online learning algorithm for the update output layer weights. However, the work described in those papers fails to use additional layers for denoising complex signals.

Thus, a continuing need exists for system that employs real-time learning with reservoir computers and specialized neuromorphic core for denoising applications. Such a neuromorphic core should allow for adaptation in real time in order to optimize the rapid detection and sensing of signals present in the input stream, using fewer resources than the prior reservoir-based art. Further, such a core and hardware implementation should be operable for combining additional layers to handle complex-valued I/Q signals.

SUMMARY OF INVENTION

The present disclosure is directed to a Neuromorphic Adaptive Core (NeurACore) cognitive signal processor (CSP) for wide instantaneous bandwidth denoising of noisy signals. The NeurACore CSP includes a NeurACore block (FPGA or processor(s), etc.), a globally learning layer, and a neural combiner. The NeurACore block is operable for receiving as an input a mixture of in-phase and quadrature (I/Q) signals and mapping the I/Q signals onto a neural network to determine complex-valued output weights of neural states of the neural network. The global learning layer is operable for adapting the complex-valued output weights to predict a most likely next value of the input I/Q signal. Further, the neural combiner is operable for combining a set of delayed neural state vectors with the weights of the global learning layer to compute an output signal, the output signal being separate in-phase and quadrature signals.

In another aspect, the complex-valued output weights are K delayed states weighted by matrix elements.

In yet another aspect, the NeurACore CSP is implemented as a Wide Instantaneous Bandwidth (WIB) NeurACore by incorporating a process that includes an adaptive core equation, output layer update equations, and weights update equations.

Further in the output layer update equations, an output is created after an elementwise multiplication between weights (C) and states (X), a size of which is determined by a systems embedding factor (K).

Additionally, the output layer update equation is modified to represent hardware delays.

In yet another aspect, the NeurACore block includes nodes that are operable as resonators and oscillators with a tunable frequency and tunable quality factor to denoise radio frequency and acoustic signals.

In another aspect, the NeurACore block is configured to handle both real and complex-valued I/Q signals, with the CSP operable with matrices A and B as follows:

$$\begin{bmatrix} \dot{X}_I \\ \dot{X}_Q \end{bmatrix} = \underline{A} \begin{bmatrix} X_I \\ X_Q \end{bmatrix} + \underline{B}_I u_I + \underline{B}_Q u_Q,$$

where X denotes a neural state space vector, and where I and Q subscripts denote I and Q channels of input u.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
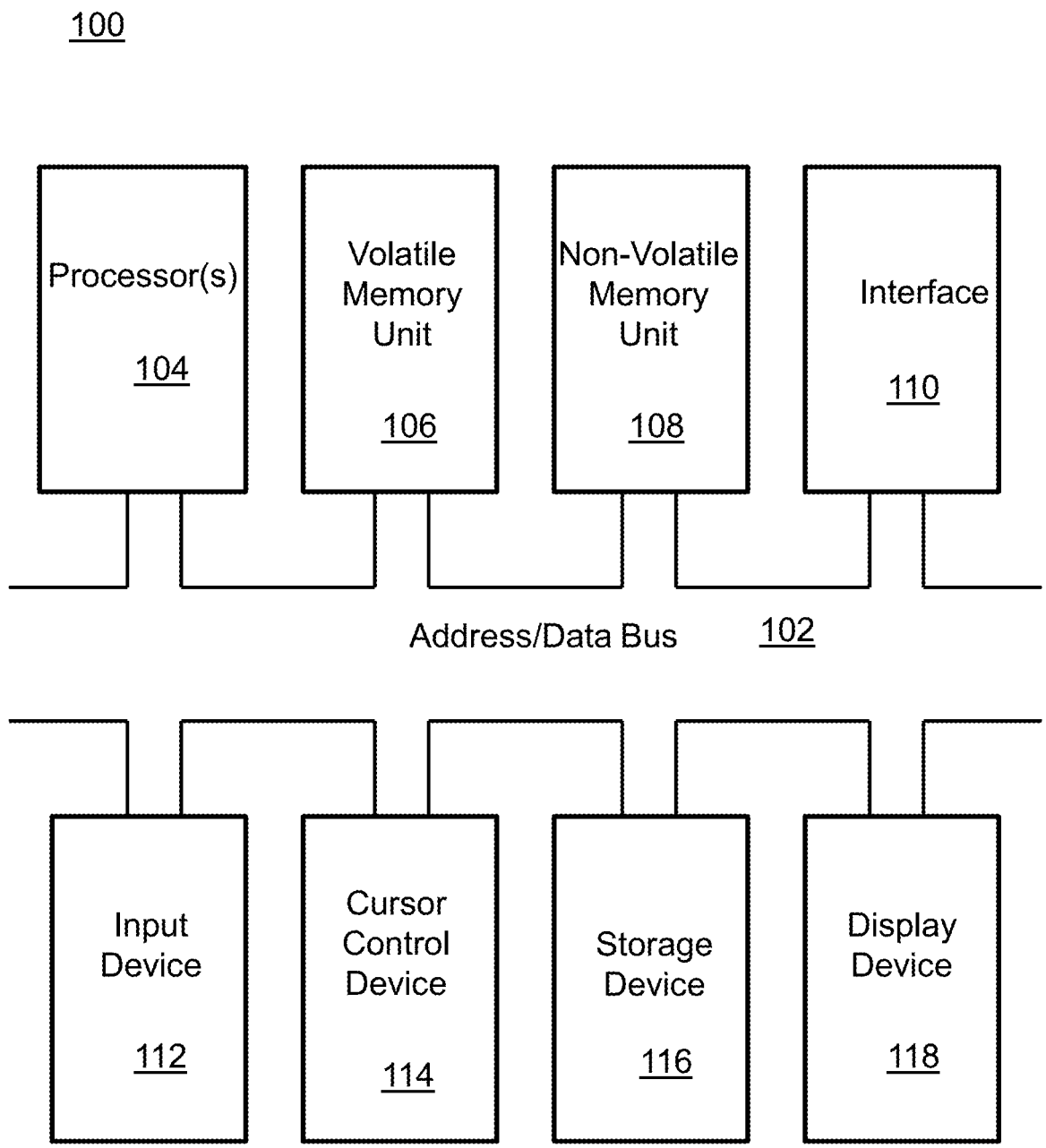
FIG. 1 is a block diagram depicting the components of a system according to various embodiments of the present invention.

The present invention relates to signal processor and, more specifically, to a cognitive signal processor (CSP) formed as an efficient hardware implementation with a wide instantaneous bandwidth neuromorphic adaptive core (NeurACore). The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

Before describing the invention in detail, first a description of the various principal aspects of the present invention is provided. Subsequently, an introduction provides the reader with a general understanding of the present invention. Finally, specific details of various embodiment of the present invention are provided to give an understanding of the specific aspects.

(2) Principal Aspects

Various embodiments of the invention include at least three "principal" aspects. The first is a system embodied as a cognitive signal processor (CSP) formed as an efficient hardware implementation with a wide instantaneous bandwidth neuromorphic adaptive core (NeurACore). In one aspect, the CSP performs signal denoising and is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform, or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA) or any other processing component operable for performing the relevant operations.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology. Further, one or more processors 104 (or devices, such as autonomous platforms or signal processors) can be associated with one or more associated memories, where each associated memory is a non-transitory computer-readable medium. Each associated memory can be associated with a single processor 104 (or device), or a network of interacting processors 104 (or devices).

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
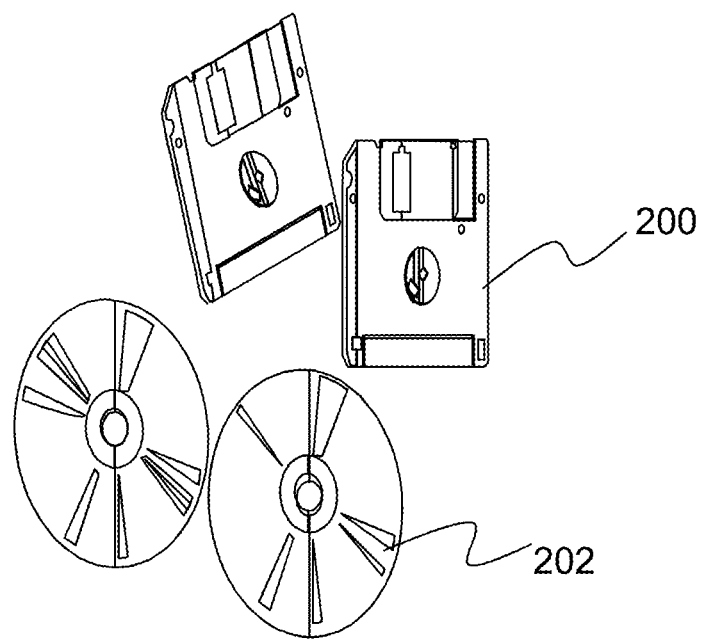
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

As noted above, the present disclosure is directed to a cognitive signal processor (CSP) formed as an efficient hardware implementation with a wide instantaneous bandwidth neuromorphic adaptive core (NeurACore). A unique aspect is the NeurACore architecture that is capable of processing complex I/Q (in-phase and quadrature) signals and online learning throughout the core as well as the output layers.

The CSP includes a time-evolving neural network comprising the NeurACore, which allows rapid adaptation of the CSP to new circumstances. A very simple example of such adaptation is the continuous shifting of pole frequencies along with adjusting their Quality (Q)-factors to sense and track composite signals, in order to optimally de-noise and separate them. The CSP also includes a learning output layer that computes complex-valued weights for the complex-valued neural state vector. This enables output layer learning for complex-valued I/Q (in-phase and quadrature) signals that are common in communication and radar signal processing. Based on the above, the CSP and NeurACore of the present disclosure is significantly different than existing technologies, with multiple innovations such as: (1) the ability to embed physical model equations in the cores and/or output layer, (2) the neuromorphic adaptive cores (as referenced above), and (3) the ability to extend the learning output layer to a true complex-valued formulation that maintains the phase relationship between the I- and Q-channels instead of a simplistic system that de-noises the I- and Q-channels independently.

As can be appreciated by those skilled in the art, the NeurACore CSP architecture enables real-time complex/real signal denoising/detection algorithms capable of ultra-wide bandwidth operation with signal processing units that are ultra-low Cost, Size, Weight, and Power (C-SWaP). The NeurACore denoiser can detect and de-noise complex (I/Q) signals, including Low Probability of Intercept/Detection (LPI/LPD) and frequency hopping signals, improving signal-to-noise (SNR) performance by over 20 dB for a variety of different waveforms. The application domain of the NeurACore CSP includes, but is not limited to radar, communication, acoustic, audio, video and optical waveforms. The NeurACore I/Q cognitive signal processor as described in this disclosure can also be used to improve SNR of the various radar units included in an autonomous driving system. The very wide bandwidth, fast response to input changes, and low C-SWaP attributes of our CSP are enabled by a combination of (1) very rapid online learning and (2) the fast adaptability of the core weights, which enables tracking and adapting to rapid changes using a reduced complexity core. The NeurACore design can also be used as a basis to develop novel controllers, an example of which is provided in further detail below.

The present disclosure also provides an implementation of the NeurACore, used for the denoising of complex (I/Q) signals on a wide instantaneous bandwidth (IBW). Thus, in one aspect, the system itself is a wideband denoiser which would greatly improve SWAP over comparable systems with the same performance (i.e., conventional channelizer). The system performs real time denoising with incorporated delay tolerant functions. The architecture consists of an adaptive core capable of embedding system physics/specifics with learning throughout the core and an online learning layer for rapid adaptation to novel situations. The two in conjunction allows for the system to perform denoising on incoming signals without prior knowledge about the signal type.

A purpose of our invention is a system for real-time complex/real signal denoising. The denoiser will provide detection and denoising of complex (I/Q) signals including low probability of intercept (LPI) low probability of detection (LPD) and frequency hopping signals and improve the signal-to-noise ratio (SNR) performance by >20 dB for variety of different waveforms. Some advantages of this implementation is the low latency and utilization of system physics. Comparable systems, like a conventional channelizer, would operate over a smaller frequency spectrum and likely require larger latency. While current machine learning approaches would require large quantities of online/offline training data, would not utilize our physics approach, and would incur larger latency and Size-Weight-and-Power (SWAP).

As can be appreciated by those skilled in the art, many commercial and military signal processing platforms require small size, ultra-wide bandwidth operation, ultra-low C-SWaP signal processing units, and artificial Intelligence enhanced with real-time signal processing capability. For example, the system of the present disclosure can be implemented in signal processing platforms that process radar, communication, acoustic, audio, video and optical waveforms, etc.

Specific details are provided below.

(3) Specific Details of Various Embodiments

As referenced above, the present disclosure is directed to a cognitive signal processor (CSP) having a Neuromorphic Adaptive Core (NeurACore) and an implementation of the NeurACore used for the denoising of complex (I/Q) signals on a wide instantaneous bandwidth (IBW). For clarity, the NeurACore and subsequent implementation used on IBW are described in turn below.

(3.1) Neuromorphic Adaptive Core (NeurACore)

Figure 3:
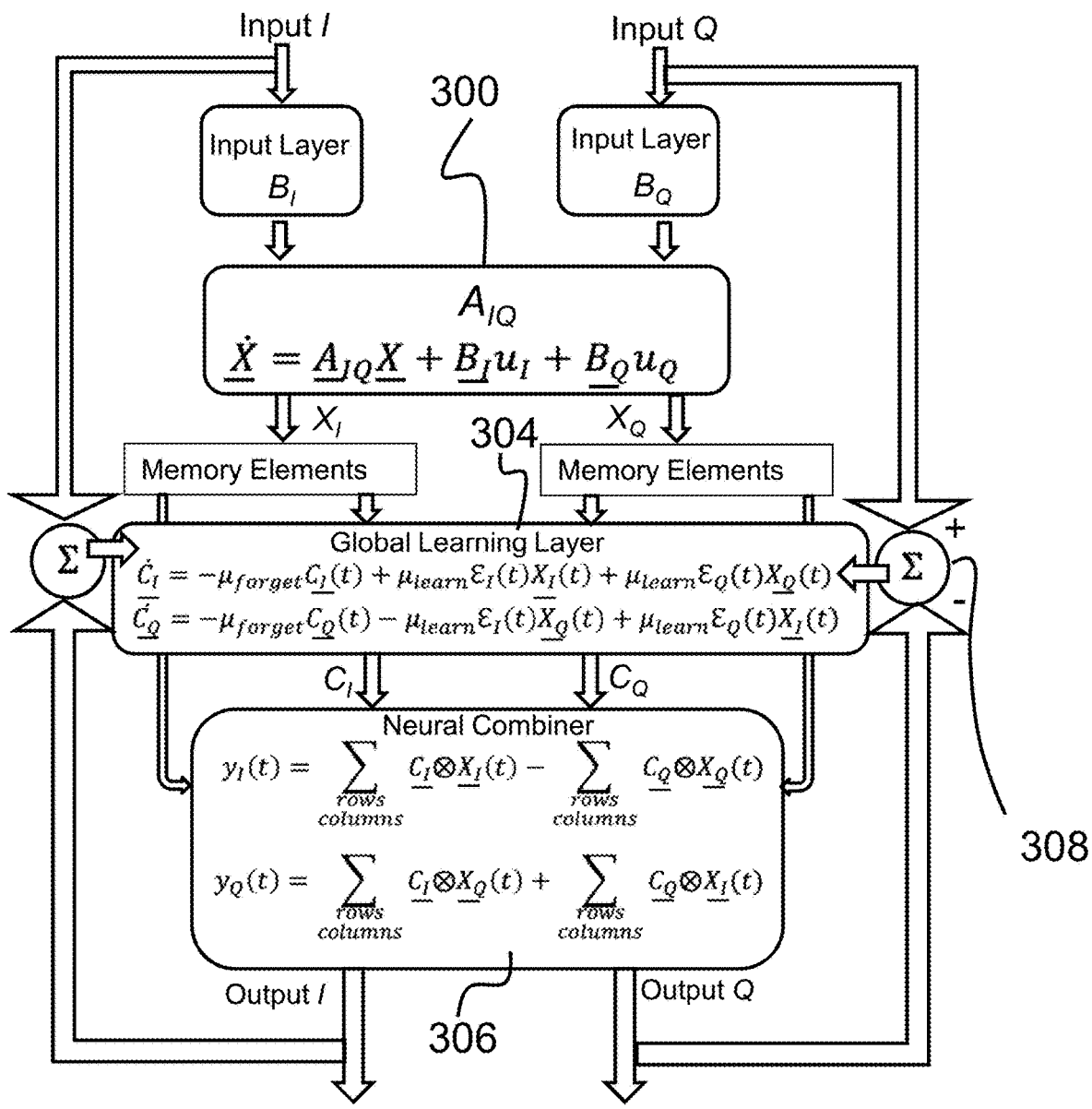
FIG. 3 is a diagram depicting architecture of a Neuromorphic Adaptive Core (NeurACore) according to various embodiments of the present invention.

The NeurACore CSP architecture comprises three primary functional modules and two optional ones that can be brought online independently of each other. The main architecture along with a list of key innovations are shown in FIG. 3. The first primary block, referred to as the neuromorphic adaptive core (NeurACore) 300 operates as a local learning layer block and receives as input a mixture of real and I/Q signals that it maps onto a neuromorphic core neural network with weights that are by default fixed. The local learning layers enable real-time optimization of a "feature extraction" process. The NeurACore 300 can be adapted in real time using various parameters including, but not limited to, the neural state vector of the cores and optional time-evolving embedded physical models. The second primary module, called "global learning layer" 304, is a short-time online learning engine that adapts the complex-valued output weights (C) of the reservoir states to predict the most likely next value of the input signal.

This module 304 uses layers to effectively learn system functions. The third primary module, referred to as the "neural combiner" 306, then combines a set of delayed neural state vectors with the weights of the global learning layer module 304 to compute the output signal. The global learning layer module 304 can optionally embed 308 physical models into the NeurACore (e.g., such as a physics enhanced controller). Further details regarding these components are provided below.

(3.1.1) Concept

A neuromorphic core with fixed weights is a special type of Recurrent Neural Network (RNN) that can be represented in state-space form as follows:

$$\dot{\underline{X}}(t) = \underline{A}\underline{X}(t) + \underline{B}u(t)$$

$$y(t) = \underline{C}(t)^T \underline{X}(t) + D(t)u(t),$$

where $\underline{A}$ is the connectivity matrix with fixed weights, $\underline{B}$ is the vector mapping the input $u(t)$ to the core, $\underline{X}(t)$ is the neural state vector, $\underline{C}(t)$ is the set of tunable output layer weights that map a time-delayed set of states to the output $y(t)$, and $D(t)$ is the seldom used direct mapping from input to output. It should be noted that, in one aspect, u(t) is an unknown RF signal that is being decomposed into its constituent signals.

By adapting the connection weights of the core in real time, it is extended into a neuromorphic adaptive core (NeurACore) 300 and the CSP takes on the new generic form $$\underline{\dot{X}}(t) = \underline{A}(\underline{X}(t), u(t), \ldots)\underline{X}(t) + \underline{B}u(t)$$

$$y(t) = \underline{C}(t)^T \underline{X}(t) + D(t)u(t),$$

where the expression $\underline{A}(\underline{X}(t), u(t), \ldots)$ explicitly indicates the time-dependence of the cores on the neural state vector, the input, and other possible parameters of the A matrix, such as an embedded physics model (that can be added) or any other suitable model.

(3.1.2) Complex-Valued Formulation

The NeurACore CSP is designed to handle both real and complex-valued In phase and Quadrature phase (I/Q) signals; therefore, any quantities in the matrices and vectors of the CSP equations can be complex-valued. From here on, the real and imaginary parts of all quantities are explicitly written to (1) show how the phase-preserving relationship between the I-(real part) and Q-(imaginary part) signals works, and (2) to make the formulation compatible with embedded hardware that typically cannot process true complex-valued variables. The first equation of the CSP takes the form:

$$\begin{bmatrix} \dot{X}_I \\ \dot{X}_Q \end{bmatrix} = \underline{A} \begin{bmatrix} X_I \\ X_Q \end{bmatrix} + \underline{B}_I u_I + \underline{B}_Q u_Q,$$

where the I and Q subscripts refer to the I- and Q-channels. For example, $u_I$ is the I-channel of the input and $u_Q$ is the Q-channels of the input.

(3.1.3) NeurACore Instantiation for Communication and Radar Systems

While the NeurACore architecture is very general, of particular practical interest is its instantiation for processing radio frequency (RF) and acoustic signals for communication and radar/sonar. For such applications, the nodes of the core are designed to be resonators/oscillators with tunable frequency ω and tunable quality factor Q. For this instantiation of NeurACore, the $\underline{A}$ matrix comprises of the following 2×2 blocks and $\underline{B}$ consists of 2×1 blocks:

$$\underline{A}^{2 \times 2} = \begin{bmatrix} -\frac{|\omega_0|}{Q_0} & -\omega_0 \\ \omega_0 & -\frac{|\omega_0|}{Q_0} \end{bmatrix}$$

$$\underline{B}_I^{2 \times 1} = \frac{|\omega_0|}{Q_0} \begin{bmatrix} 1 \\ 0 \end{bmatrix}$$

$$\underline{B}_Q^{2 \times 1} = \frac{|\omega_0|}{Q_0} \begin{bmatrix} 0 \\ 1 \end{bmatrix}$$

These then constitute the complex conjugate pole pairs, as follows:

$$p_{01} = -\frac{|\omega_0|}{Q_0} + i\omega_0 \text{ and } p_{02} = -\frac{|\omega_0|}{Q_0} - i\omega_0.$$

For this instantiation, the matrices and vectors of the first equation of NeurACore have the following general form:

$$\underline{A} = \begin{bmatrix} \begin{bmatrix} -\frac{|\omega_1|}{Q_1} & -\omega_1 \\ \omega_1 & -\frac{|\omega_1|}{Q_1} \end{bmatrix} & & & \\ & \begin{bmatrix} -\frac{|\omega_2|}{Q_2} & -\omega_2 \\ \omega_2 & -\frac{|\omega_2|}{Q_2} \end{bmatrix} & & \\ & & \ldots & \\ & & & \begin{bmatrix} -\frac{|\omega_N|}{Q_N} & -\omega_N \\ \omega_N & -\frac{|\omega_N|}{Q_N} \end{bmatrix} \end{bmatrix}$$

$$\underline{B}_I = \begin{bmatrix} \frac{|\omega_1|}{Q_1} \\ 0 \\ \frac{|\omega_2|}{Q_2} \\ 0 \\ \ldots \\ \frac{|\omega_N|}{Q_N} \\ 0 \end{bmatrix}$$

$$\underline{B}_Q = \begin{bmatrix} 0 \\ \frac{|\omega_1|}{Q_1} \\ 0 \\ \frac{|\omega_2|}{Q_2} \\ \ldots \\ 0 \\ \frac{|\omega_N|}{Q_N} \end{bmatrix}$$

where N is the total number of pole pairs.

(3.1.4) NeurACore Adaptation Module

There are many possible optional adaptation strategies for the core weights of

Figure 4:
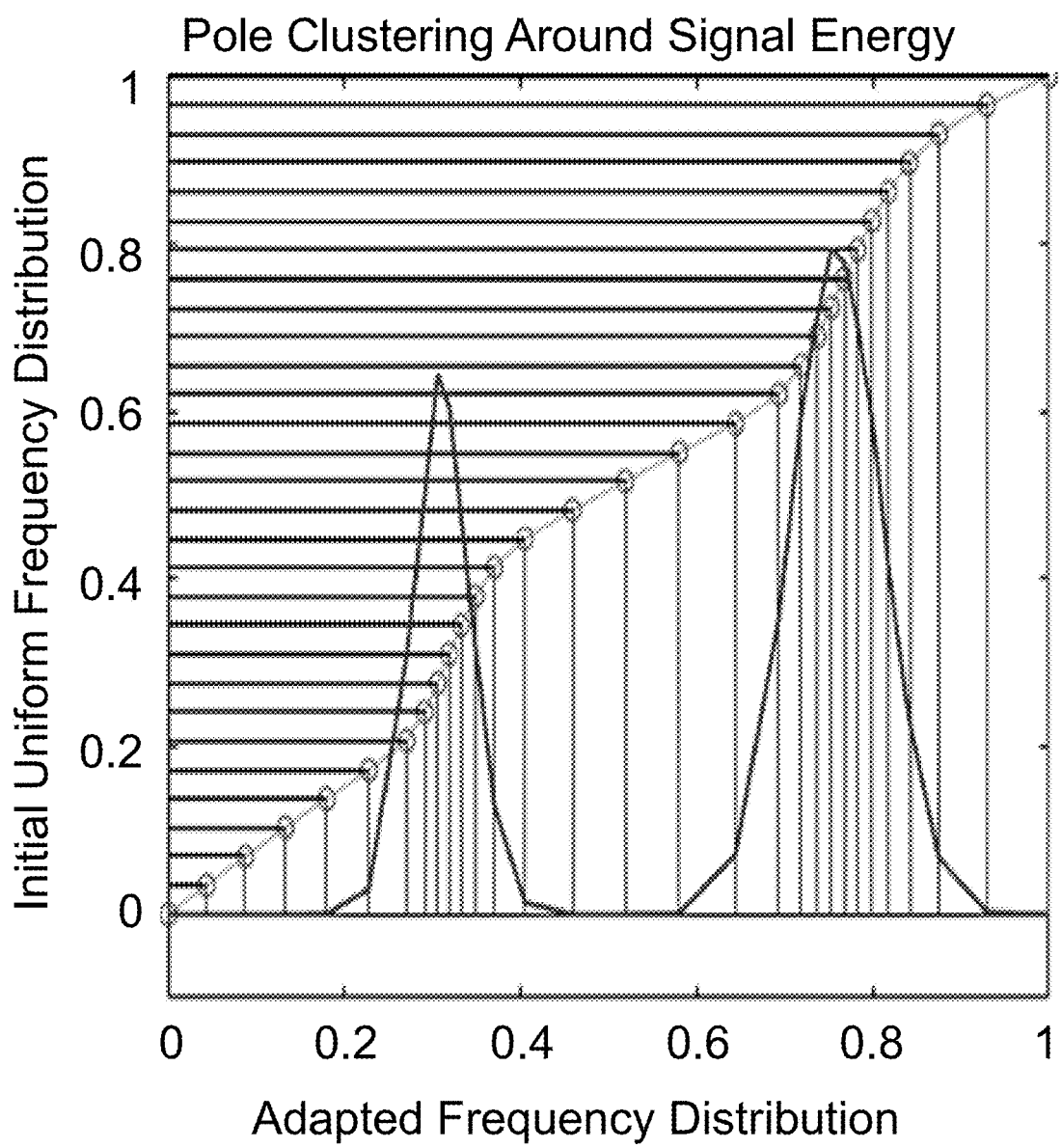
FIG. 4 is a chart depicting frequency adaptation to cluster poles around signals.
Figure 5:
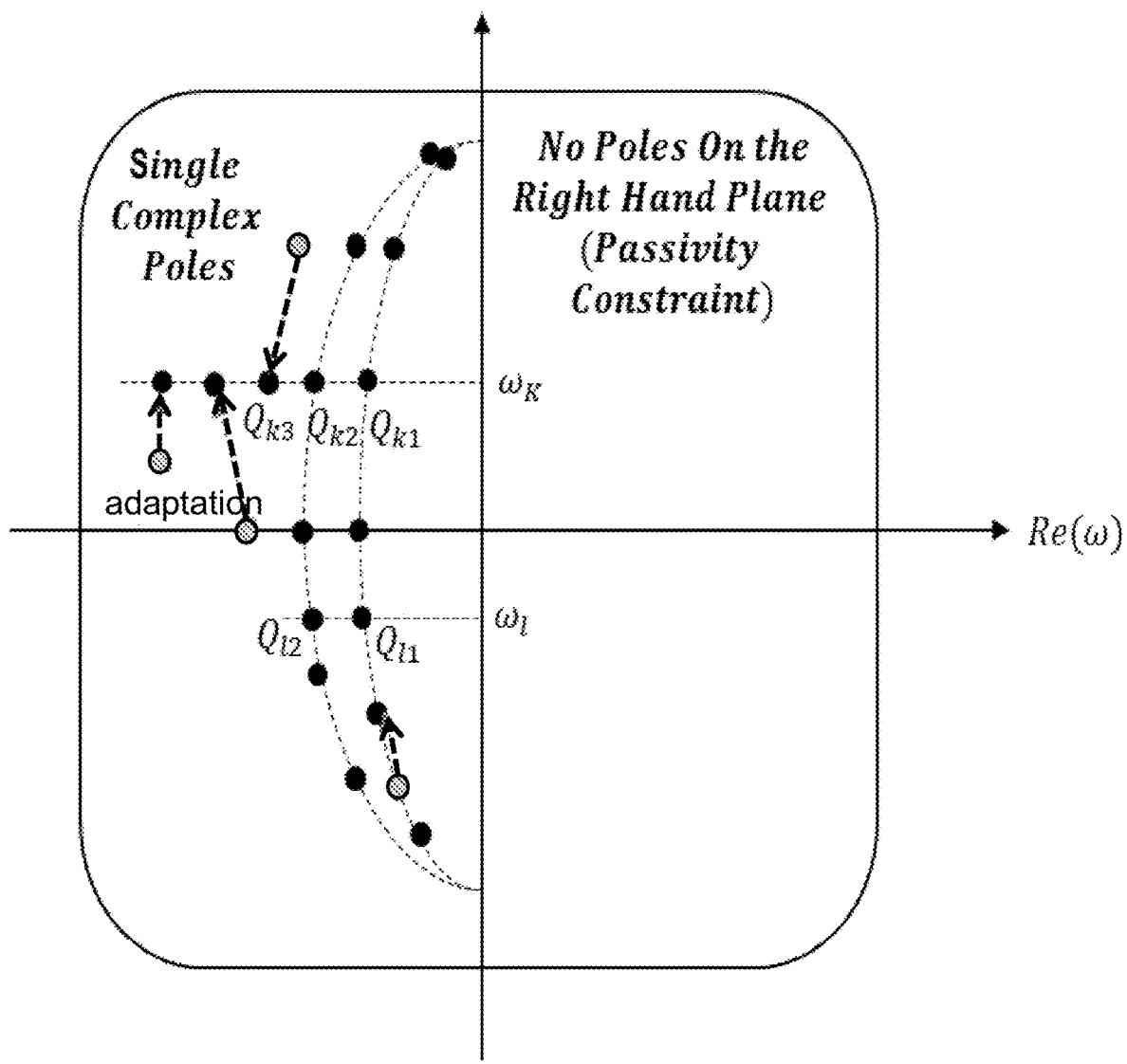
FIG. 5 is an image depicting a general pole adaptation plane.

NeurACore. Provided below is an example of adaptation for the communication/radar instantiation of NeurACore described in the previous section. The neural state space vector X captures in real time the spectrum of the input signal mixture, which can be used to adapt the frequencies of the poles to detect and track optimally the various signals in the input. FIG. 4 is a graph depicting how the poles cluster around two signals revealed by the neural state space vector. More generally, both the frequency ω and tunable quality factor Q of each pole can be adapted based on the state space spectrum and other variables, as depicted in FIG. 5. Thus, in one aspect, the adaption module 302 allows a user to adapt the frequency ω and tunable quality factor Q of each pole.

(3.1.5) Complex-valued Online Learning Module for Output Layer

The purpose of the Global Learning Layer module 304 is to compute at each time step values for the complex-valued weights $\underline{C}$ for combining a preset number of time-delayed neural state vectors to predict the most likely next value of the input signal. To optimize the likelihood of the predicted input value, a gradient descent approach is used that is cast in differential form:

$$\underline{\dot{C}}_I = -\mu_I \nabla_{\underline{C}_I} E\{\underline{C}_I, \underline{C}_Q\}$$

-continued
$$\dot{\underline{C}}_Q = -\mu_Q \nabla_{\underline{C}_Q} E\{\underline{C}_I, \underline{C}_Q\}$$

where $$\nabla_{\underline{C}_I}$$

is the gradient of CI, and where the weights for the K delayed state have the form $$C_I = \begin{bmatrix} C_{I11}(t) & \cdots & C_{I(K+1)1}(t) \\ C_{I12}(t) & \cdots & C_{I(K+1)2}(t) \\ \cdots & \cdots & \cdots \\ C_{I1N}(t) & \cdots & C_{I(K+1)N}(t) \end{bmatrix}$$

$$C_Q = \begin{bmatrix} C_{Q11}(t) & \cdots & C_{Q(K+1)1}(t) \\ C_{Q12}(t) & \cdots & C_{Q(K+1)2}(t) \\ \cdots & \cdots & \cdots \\ C_{Q1N}(t) & \cdots & C_{Q(K+1)N}(t) \end{bmatrix}$$

and $$E\{\underline{C}_I, \underline{C}_Q\} = \left( u_I(t) - \sum_{\substack{rows \\ colums}} \underline{C}_I(t-\tau_{pred}) \otimes \underline{X}_I(t-\tau_{pred}) + \sum_{\substack{rows \\ colums}} \underline{C}_Q(t-\tau_{pred}) \otimes \underline{X}_Q(t-\tau_{pred}) \right)^2 +$$

$$\left( u_Q(t) - \sum_{\substack{rows \\ colums}} \underline{C}_I(t-\tau_{pred}) \otimes \underline{X}_Q(t-\tau_{pred}) - \sum_{\substack{rows \\ colums}} \underline{C}_Q(t-\tau_{pred}) \otimes \underline{X}_I(t-\tau_{pred}) \right)^2 +$$

$$\lambda_I \sum_{\substack{rows \\ colums}} \underline{C}_I(t) \otimes \underline{C}_I(t) + \lambda_Q \sum_{\substack{rows \\ colums}} \underline{C}_Q(t) \otimes \underline{C}_Q(t)$$

where $$\underline{X}_I = \begin{bmatrix} x_{I1}(t) & \cdots & x_{I1}(t-K\tau) \\ x_{I2}(t) & \cdots & x_{I2}(t-K\tau) \\ \cdots & \cdots & \cdots \\ x_{IN}(t) & \cdots & x_{IN}(t-K\tau) \end{bmatrix}$$

$$\underline{X}_Q = \begin{bmatrix} x_{Q1}(t) & \cdots & x_{Q1}(t-K\tau) \\ x_{Q2}(t) & \cdots & x_{Q2}(t-K\tau) \\ \cdots & \cdots & \cdots \\ x_{QN}(t) & \cdots & x_{QN}(t-K\tau) \end{bmatrix}.$$

(3.1.6) Output Update (by the Neural Combiner 306)

The denoised output is determined by combining the K delayed states weighted by the C matrix elements obtained from the online Global Learning Layer module 304 described in the previous section, using the following formulas:

$$y_I(t) = \sum_{\substack{rows \\ colums}} \underline{C}_I \otimes \underline{X}_I(t) - \sum_{\substack{rows \\ colums}} \underline{C}_Q \otimes \underline{X}_Q(t)$$

$$y_Q(t) = \sum_{\substack{rows \\ colums}} \underline{C}_I \otimes \underline{X}_Q(t) + \sum_{\substack{rows \\ colums}} \underline{C}_Q \otimes \underline{X}_I(t).$$

Thus, the neural combiner 306 combines the set of delayed neural state vectors with the weights of the Global Learning Layer module 304 to compute the output signal. The output signal is the resulting denoised complex (I/Q) signal (i.e., separate in-phase and quadrature signals).

(3.2) Hardware Implementation of a Wide Instantaneous Bandwidth NeurACore

As noted above, the present disclosure also provides a hardware implementation of a Wide Instantaneous Bandwidth (WIB) NeurACore. The WIB implementation of the invention can be summarized by three equations as provided below, the adaptive core equations, the output layer update equations, and the weights update equations. These three make up the system which inputs are $u_I$ and $u_Q$, with denoised outputs $y_I$ and $y_q$. A full overview of the system can be seen in FIG. 3.

$$\begin{bmatrix} \dot{x}_I \\ \dot{x}_Q \end{bmatrix} = \underline{A} \begin{bmatrix} x_I \\ x_Q \end{bmatrix} + \underline{B}_I u_I + \underline{B}_Q u_Q$$

Adaptive Core Equation $$y_I(t) = \sum_{\substack{rows \\ colums}} \underline{C}_I \otimes \underline{X}_I(t) - \sum_{\substack{rows \\ colums}} \underline{C}_Q \otimes \underline{X}_Q(t)$$

$$y_Q(t) = \sum_{\substack{rows \\ colums}} \underline{C}_I \otimes \underline{X}_Q(t) + \sum_{\substack{rows \\ colums}} \underline{C}_Q \otimes \underline{X}_I(t)$$

Output Layer Update Equations $$\dot{\underline{C}}_I = -\mu_{forget} \underline{C}_I(t) + \mu_{learn} \varepsilon_I(t) \underline{X}_I(t) + \mu_{learn} \varepsilon_Q(t) \underline{X}_Q(t)$$

$$\dot{\underline{C}}_Q = -\mu_{forget} \underline{C}_Q(t) - \mu_{learn} \varepsilon_I(t) \underline{X}_Q(t) + \mu_{learn} \varepsilon_Q(t) \underline{X}_I(t)$$

Weights Update Equation part 1, where C I/Q represent the "weights".

$$\varepsilon_I(t) = u_I(t) - y_I(t-\tau_{pred})$$

$$\varepsilon_Q(t) = u_Q(t) - y_Q(t-\tau_{pred})$$

Weights Update Equations part 2, ε I/Q represent the error for I/Q.

(3.2.1) Neuromorphic Adaptive Core

As shown in FIG. 3 and as referenced above, the Neuromorphic Adaptive Core 300 includes three matrices A, BI, and BQ (shown below), where A contains both I/Q information. The matrix values are first trained offline with specific connections made between set locations, but during operation the matrices will adapt to the incoming frequency. Typically, in a deep neural network (DNN) there would be random connectivity weights between matrices. However, in the present system, the A matrix is sparsely filled to reduce overall computations for hardware efficiency, as follows:

$$\underline{A}_S^{[N_s \times N_s]} = \begin{bmatrix} \begin{bmatrix} A_{11} & A_{12} \\ A_{21} & A_{22} \end{bmatrix} & [\underline{0}] & \cdots & [\underline{0}] \\ [\underline{0}] & \begin{bmatrix} A_{33} & A_{34} \\ A_{43} & A_{44} \end{bmatrix} & \cdots & [\underline{0}] \\ \cdots & \cdots & \cdots & \cdots \\ [\underline{0}] & [\underline{0}] & [\underline{0}] & \begin{bmatrix} A_{(N_s-1),(N_s-1)} & A_{(N_s-1),N_s} \\ A_{N_s,(N_s-1)} & A_{N_s,N_s} \end{bmatrix} \end{bmatrix}$$

The NeurACore matrix dimensions are determined by the system size and hardware latency. The Adaptive Core Equation (provided in Section 3.2) is a simplified version of the Adaptive Core equation; however, to account for hardware delays the equation would change to the Hardware Delayed Version provided below:

$$\underline{x}_n = \underline{A}_S \underline{x}_{[n]-N_{\tau_x}} + \underline{B}_{I,S} \begin{bmatrix} u_{I,[n+N_{\tau_x}]-N_{\tau_x}} \\ u_{I,[n+N_{\tau_x}-1]-N_{\tau_x}} \\ \ldots \\ u_{I,[n+1]-N_{\tau_x}} \\ u_{I,[n]-N_{\tau_x}} \end{bmatrix} + \underline{B}_{Q,S} \begin{bmatrix} u_{Q,[n+N_{\tau_x}]-N_{\tau_x}} \\ u_{Q,[n+N_{\tau_x}-1]-N_{\tau_x}} \\ \ldots \\ u_{Q,[n+1]-N_{\tau_x}} \\ u_{Q,[n]-N_{\tau_x}} \end{bmatrix},$$

where $N_{tx}$ is equal to the number of clock cycles needed to perform calculations to update X.

The delays would be determined based on the hardware constraints such as multiplier result latency and addition latency. As the latency would have an effect on the calculation the system would eventually find a balance between delayed versions of the input and the amount of computation needed to perform the Adaptive Core Equation. As an example, let's examine a system with three clock cycle delays per multiplication. The ideal (no delay) multiplication would look like y(n)=c(n)*x(n) where n is the nth clock cycle. Typically values of digital variables are stored in digital registers that are available for readout at the end of each clock cycle. For ideal multiplication it would mean that the multiplication result (y) would be available at the same time when the input values (c and x) would be available to read in for the multiplication unit. It would mean that the multiplication result is generated in zero time since the multiplication output (y) is available at the same time when the inputs (c and x) arrive. In a real hardware there is always a delay to execute an operation, such as multiplication. Assuming 3 clock cycle delays for executing a multiplication, the actual equation that correctly describes this delay is y(n)=c(n−3)*x(n−3). It means that the multiplication result that is available for readout at the end of the nth clock cycle contains the multiplication result of the two input variables c and x with values of three clock cycles earlier.

(3.2.2) Output Layer Update

The output layer will produce the final denoised I/Q output of the system. As seen in the Output Layer Update Equation provided above, the output is created after an elementwise multiplication between C(weights) and X(states). The size of which is determined by the systems embedding factor ("K" or "Kemb"). This is a value set when designing the full system. Additionally, the system must account for the hardware delays in the system, thereby expanding the equation to what is seen below for the Hardware Delay Tolerant Version of the Output Layer Update Equation, as follows:

$$\hat{y}_{I,n} = y_{I,n-N_{\tau_{out}}} = \sum_{\substack{i=1 \\ (rows)}}^{N_p} \sum_{\substack{j=1 \\ (columns)}}^{K+1} \left\{ \underline{C}_{I,[n]-N_{\tau_{out}}} \otimes \underline{X}_{I,[n]-N_{\tau_{out}}} + \underline{C}_{Q,[n]-N_{\tau_{out}}} \otimes \underline{X}_{Q,[n]-N_{\tau_{out}}} \right\}$$

$$\hat{y}_{Q,n} = y_{Q,n-N_{\tau_{out}}} = \sum_{\substack{i=1 \\ (rows)}}^{N_p} \sum_{\substack{j=1 \\ (columns)}}^{K+1} \left\{ \underline{C}_{I,[n]-N_{\tau_{out}}} \otimes \underline{X}_{Q,[n]-N_{\tau_{out}}} + \underline{C}_{Q,[n]-N_{\tau_{out}}} \otimes X_{I,[n]-N_{\tau_{out}}} \right\},$$

where $N_S=2N_P$, $N_p$ is a number of poles, $N_S$ is a number of states, and $N_{tout}$ is the amount of hardware clock cycles needed to compute Y I/Q.

(3.2.3) Weights Update

The weights are updated through the equations found the Weights Update Equations, parts 1 and 2 above. Part 2 of the Weights Update Equations represents the calculation of the error between the input value and the output value. In the hardware system these will need to be delayed such that they match in time as seen in the Error Calculation equation below:

$$\varepsilon_{I,n} = \varepsilon_{I,(n+N_{\tau_p}-N_{\tau_{out}}-1)} = u_{I,([n+N_{\tau_p}-N_{\tau_{out}}]-1)} - \hat{y}_{I,([n]-1)}$$

$$\varepsilon_{Q,n} = \varepsilon_{Q,(n+N_{\tau_p}-N_{\tau_{out}}-1)} = u_{Q,([n+N_{\tau_p}-N_{\tau_{out}}]-1)} - \hat{y}_{Q,([n]-1)}.$$

As shown in the Error Calculation equation, error is calculated with balanced input/output taking into account hardware delays to calculate each error.

The Weights Update Equation part 1 shows the full weight update, including the error calculation. The forgetting rate and learning rate are constants set at the beginning of the system design. Using the previous version of the weights with a combination of the state values, learning rate, forgetting rate, and error, the system can calculate the next set of weights such that the system is always learning. To map the equation to hardware, the process expands on the calculations from the Weights Update Equation part 1, to those found in the Delay Tolerant Expansion equations below. The system can be described as implementing an online learning algorithm by using these methods described in the weight update section.

Delay Tolerant Expansion of weight update equation for CI:

$$\underline{C}_{I,n} = (1-\mu_{forget})^{N_{\tau_C}} \underline{C}_{I,([n]-N_{\tau_C})} +$$

$$(1-\mu_{forget})^{(N_{\tau_C}-1)} \mu_{learn} \varepsilon_{I,([n-N_{\tau_C}+1]-N_{\tau_C})} \underline{X}_{I,([n-N_{\tau_{out}}-N_{\tau_C}]-N_{\tau_C})} +$$

$$(1-\mu_{forget})^{(N_{\tau_C}-1)} \mu_{learn} \varepsilon_{Q,([n-N_{\tau_C}+1]-N_{\tau_C})} \underline{X}_{Q,([n-N_{\tau_{out}}-N_{\tau_C}]-N_{\tau_C})} +$$

$$(1-\mu_{forget})^{(N_{\tau_C}-2)} \mu_{learn} \varepsilon_{I,([n-N_{\tau_C}+2]-N_{\tau_C})} \underline{X}_{I,([n-N_{\tau_{out}}-N_{\tau_C}+1]-N_{\tau_C})} +$$

$$(1-\mu_{forget})^{(N_{\tau_C}-2)} \mu_{learn} \varepsilon_{Q,([n-N_{\tau_C}+2]-N_{\tau_C})} \underline{X}_{Q,([n-N_{\tau_{out}}-N_{\tau_C}+1]-N_{\tau_C})} +$$

$$\ldots + (1-\mu_{forget}) \mu_{learn} \varepsilon_{I,([n-1]-N_{\tau_C})} \underline{X}_{I,([n-N_{\tau_{out}}-2]-N_{\tau_C})} +$$

$$(1-\mu_{forget}) \mu_{learn} \varepsilon_{Q,([n-1]-N_{\tau_C})} \underline{X}_{Q,([n-N_{\tau_{out}}-2]-N_{\tau_C})} +$$

$$\mu_{learn} \varepsilon_{I,([n]-N_{\tau_C})} \underline{X}_{I,([n-N_{\tau_{out}}-1]-N_{\tau_C})} + \mu_{learn} \varepsilon_{Q,([n]-N_{\tau_C})} \underline{X}_{Q,([n-N_{\tau_{out}}-1]-N_{\tau_C})}$$

Delay Tolerant Expansion of weigh update equation for CQ:

$$\underline{C}_{Q,n} = (1-\mu_{forget})^{N_{\tau_C}} \underline{C}_{Q,([n]-N_{\tau_C})} +$$

$$-(1-\mu_{forget})^{(N_{\tau_C}-1)} \mu_{learn} \varepsilon_{I,([n-N_{\tau_C}+1]-N_{\tau_C})} \underline{X}_{Q,([n-N_{\tau_{out}}-N_{\tau_C}]-N_{\tau_C})} +$$

$$(1-\mu_{forget})^{(N_{\tau_C}-1)} \mu_{learn} \varepsilon_{Q,([n-N_{\tau_C}+1]-N_{\tau_C})} \underline{X}_{I,([n-N_{\tau_{out}}-N_{\tau_C}]-N_{\tau_C})} -$$

$$(1-\mu_{forget})^{(N_{\tau_C}-2)} \mu_{learn} \varepsilon_{I,([n-N_{\tau_C}+2]-N_{\tau_C})} \underline{X}_{Q,([n-N_{\tau_{out}}-N_{\tau_C}+1]-N_{\tau_C})} +$$

$$(1-\mu_{forget})^{(N_{\tau_C}-2)} \mu_{learn} \varepsilon_{Q,([n-N_{\tau_C}+2]-N_{\tau_C})} \underline{X}_{I,([n-N_{\tau_{out}}-N_{\tau_C}+1]-N_{\tau_C})} +$$

$$\ldots - (1-\mu_{forget}) \mu_{learn} \varepsilon_{I,([n-1]-N_{\tau_C})} \underline{X}_{Q,([n-N_{\tau_{out}}-2]-N_{\tau_C})} +$$

$$(1-\mu_{forget}) \mu_{learn} \varepsilon_{Q,([n-1]-N_{\tau_C})} \underline{X}_{I,([n-N_{\tau_{out}}-2]-N_{\tau_C})} -$$

$$\mu_{learn} \varepsilon_{I,([n]-N_{\tau_C})} \underline{X}_{Q,([n-N_{\tau_{out}}-1]-N_{\tau_C})} + \mu_{learn} \varepsilon_{Q,([n]-N_{\tau_C})} \underline{X}_{I,([n-N_{\tau_{out}}-1]-N_{\tau_C})}$$

Figure 6:
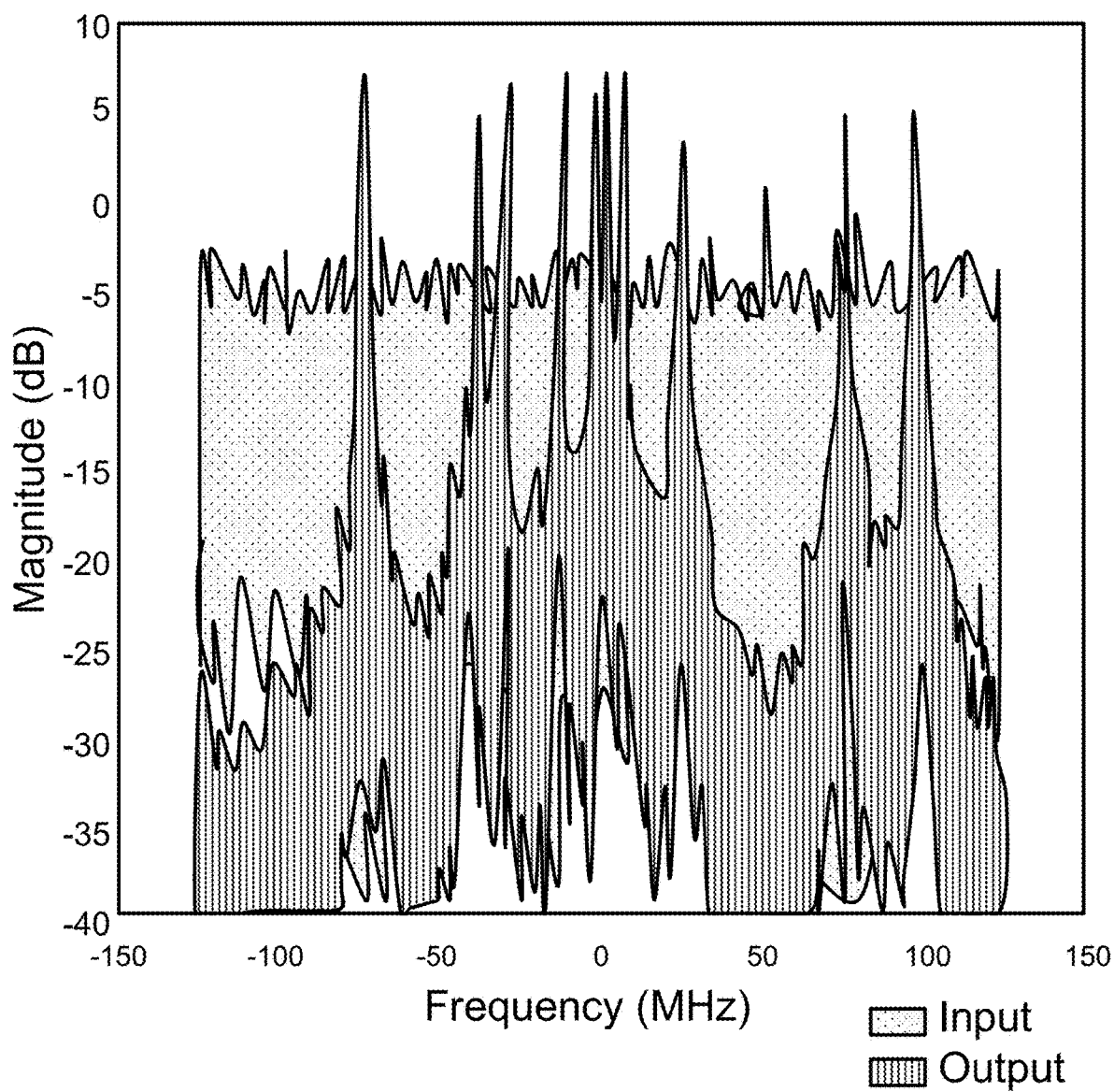
FIG. 6 is a graph depicting a Fast Fourier Transform (FFT) of signal input to and signal output from the system of the present disclosure, showing reduction in noise levels.
Figure 7A:
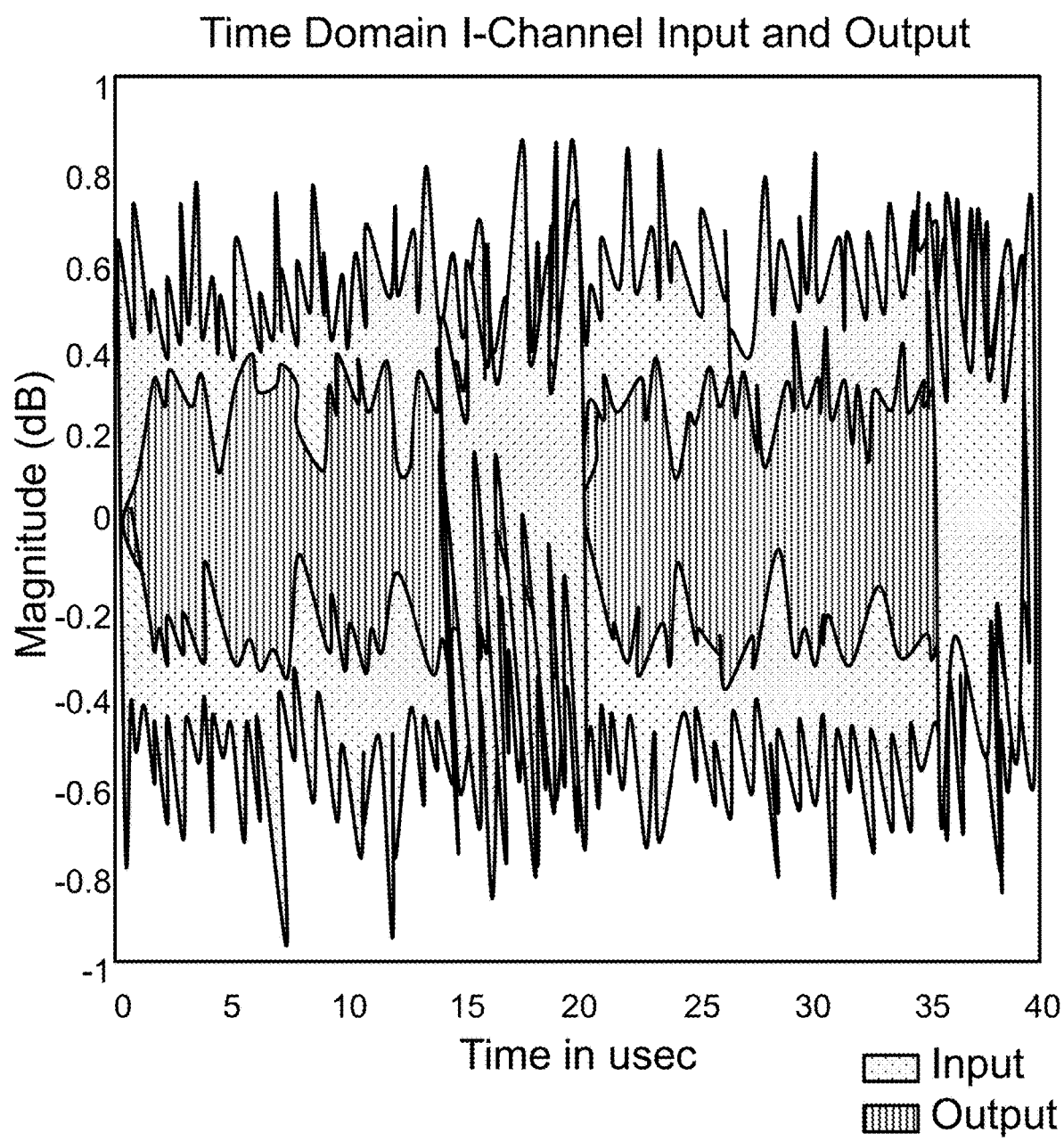
FIG. 7A is a graph depicting a Time Domain waveform of I Channel Input and Output.
Figure 7B:
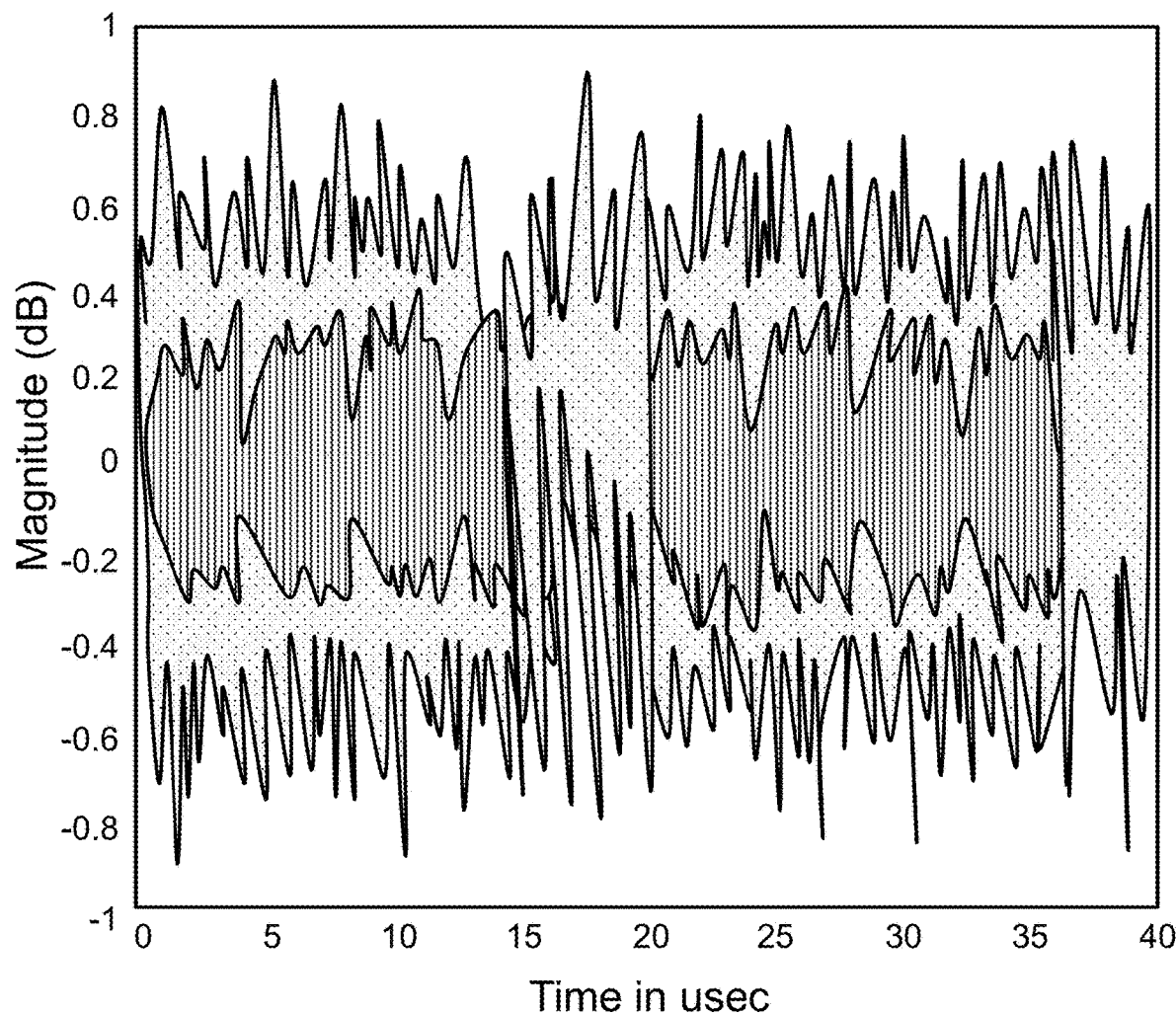
FIG. 7B is a graph depicting a Time Domain waveform of Q Channel Input and Output.
Figure 8A:
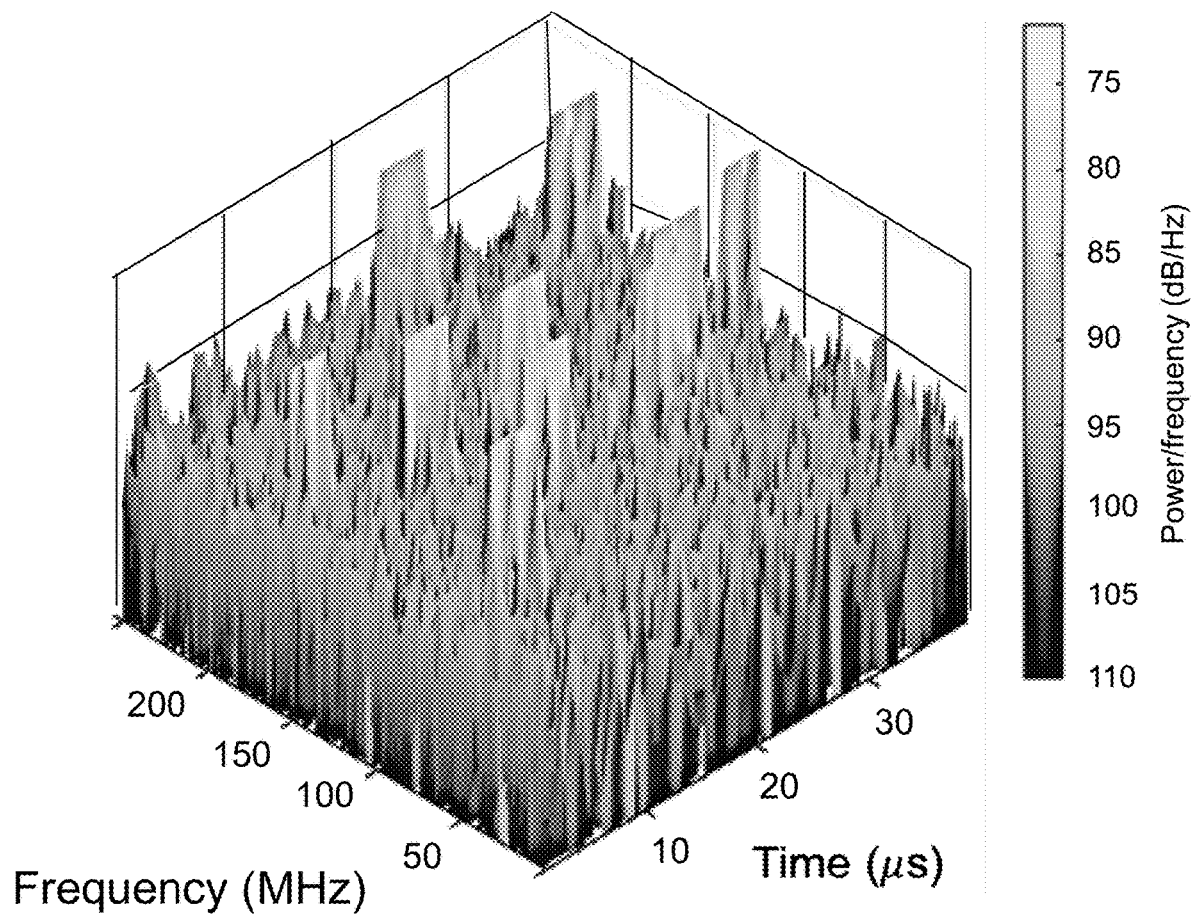
FIG. 8A is a spectrogram of the input, showing noise throughout the frequency domain.
Figure 8B:
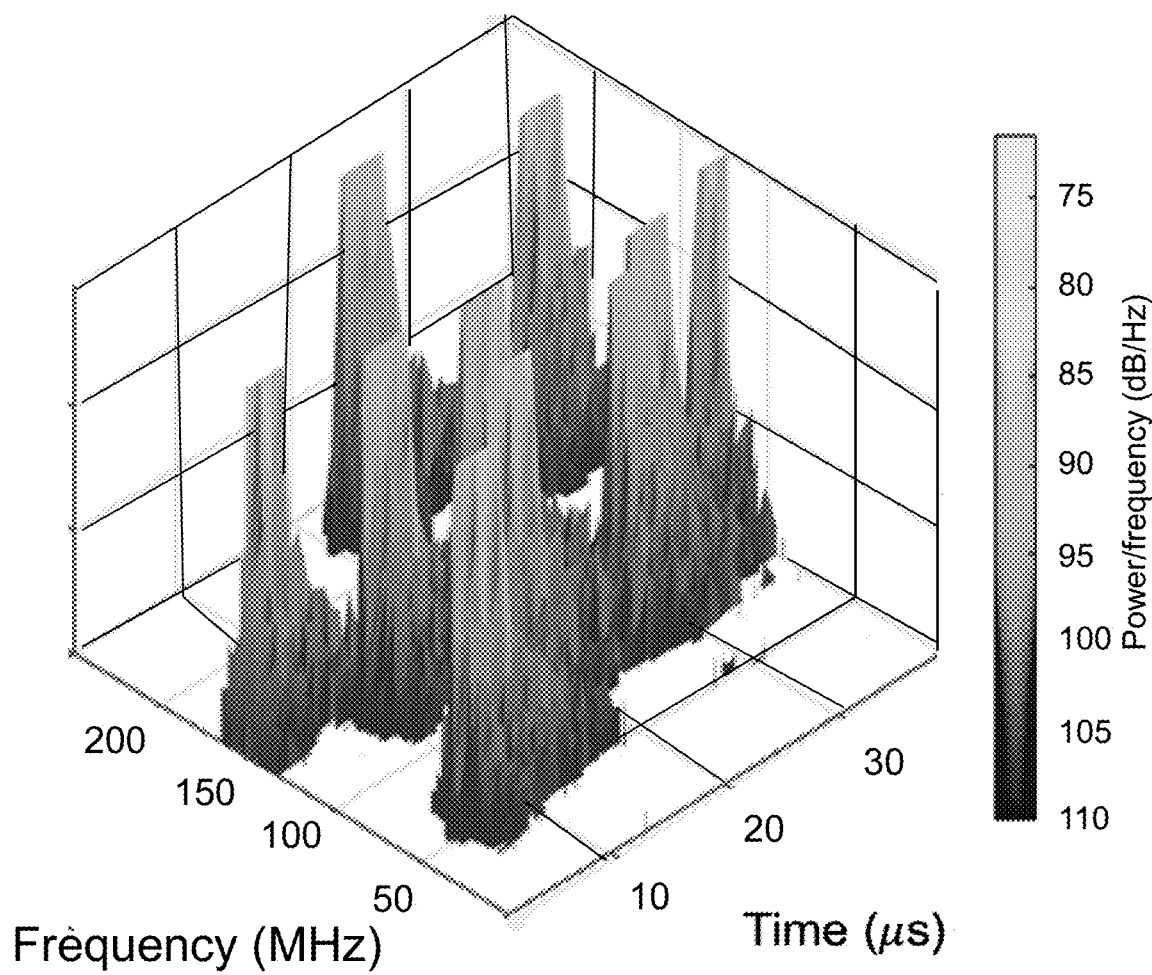
FIG. 8B is a spectrogram of the output, showing a reduction of noise throughout the frequency domain.

The system described in this disclosure has been simulated using Matlab. As an example, a fast frequency hopping simulation was designed to show the denoising capability over a wide range of unknown frequencies. The same type of input would be challenging for a common channelizer as the latency through the system would be tough to keep up with the frequency hopping signal. The hardware delays were taken into account for the simulation with an architecture that contains the following parameters: 50 poles, 100 states, 5 simulated clock delays to calculate state update, 9 simulated clock cycle delays to calculate output layer, 7 simulated clock cycle delays to calculate weight update, and an embedding length of 7. FIG. 6 depicts the FFT of the input and output frequencies, showing that the input is quite noisy containing a wide range of signals while the output correctly detects signals found in the system greatly reducing the noise floor. The reduction of noise in the time domain is shown between FIGS. 7A and 7B. The best results can be seen in FIGS. 8A and 8B, which show the reduction of noise throughout the frequency domain as a result of using the denoising algorithm. Thus and as can be appreciated by those skilled in the art, the hardware implementation for signal denoising is a low SWAP and efficient system for wide instantaneous bandwidth signal denoising.

(3.3) Control of a Device

Figure 9:
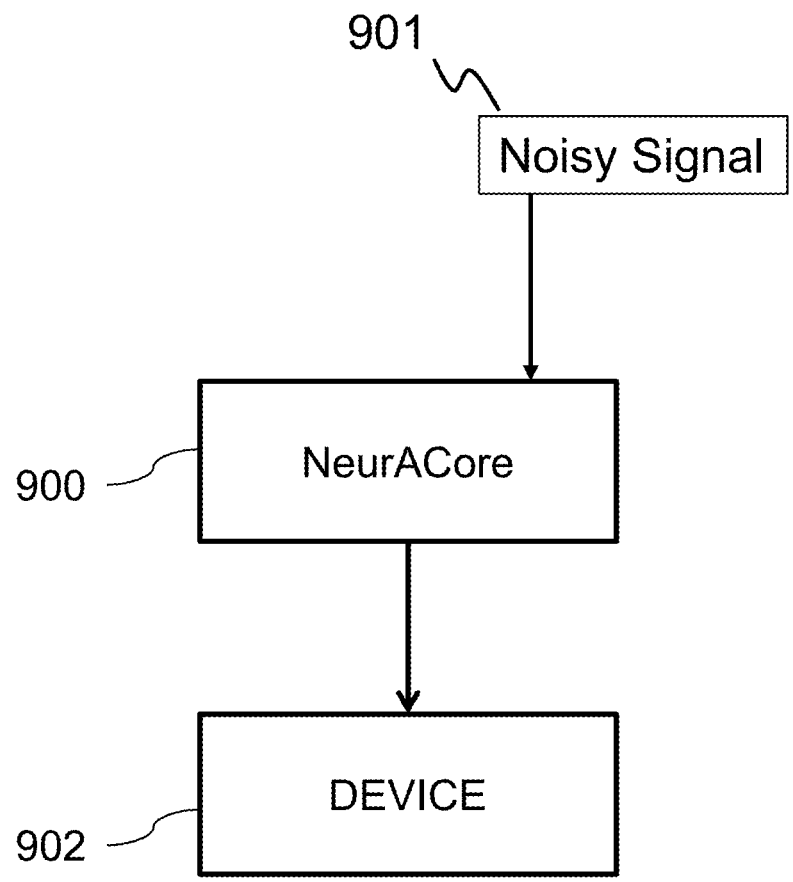
FIG. 9 is a block diagram depicting control of a device according to various embodiments.

As shown in FIG. 9, the WIB NeurACore 900 in its hardware implementation has many applications. In one aspect, the system with the NeurACore 900 can be used for signal denoising to denoise noisy input signals 901. In some aspects, the NeurACore 900 can be used to control a device 902 based on the signal denoising (e.g., a mobile device display, a virtual reality display, an augmented reality display, a computer monitor, a motor, an autonomous vehicle, a machine, a drone, a camera, etc.). In some embodiments, the device 902 may be controlled to cause the device 902 to move or otherwise initiate a physical action based on the denoised signal.

In some embodiments, a drone or other autonomous vehicle may be controlled to move to an area where an object is determined to be based on the imagery. In yet some other embodiments, a camera may be controlled to orient towards the identified object. In other words, actuators or motors are activated to cause the camera (or sensor) to move or zoom in on the location where the object is localized. In yet another aspect, if a system is seeking a particular object and if the object is not determined to be within the field-of-view of the camera, the camera can be caused to rotate or turn to view other areas within a scene until the sought after object is detected.

In addition, in a non-limiting example of an autonomous vehicle having multiple sensors, such as cameras, which might include noisy signals that need denoising. The system can denoise the signal and then, based on the signal, cause the autonomous vehicle to perform a vehicle operation. For instance, if two vehicle sensors detect the same object, object detection and classification accuracy is increased and the system described herein can cause a precise vehicle maneuver for collision avoidance by controlling a vehicle component. For example, if the object is a stop sign, the system may denoise a noisy input signal to identify the stop sign and then may cause the autonomous vehicle to apply a functional response, such as a braking operation, to stop the vehicle. Other appropriate responses may include one or more of a steering operation, a throttle operation to increase speed or to decrease speed, or a decision to maintain course and speed without change. The responses may be appropriate for avoiding a collision, improving travel speed, or improving efficiency. Non-limiting examples of devices that can be controlled via the NeurACore include a vehicle or a vehicle component, such as a brake, a steering mechanism, suspension, or safety device (e.g., airbags, seatbelt tensioners, etc.). Further, the vehicle could be an unmanned aerial vehicle (UAV), an autonomous ground vehicle, or a human operated vehicle controlled either by a driver or by a remote operator. As can be appreciated by one skilled in the art, control of other device types is also possible.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A Neuromorphic Adaptive Core (NeurACore) cognitive signal processor (CSP) for wide instantaneous bandwidth denoising of noisy signals, comprising:
    a NeurACore block, the NeurACore block being operable for receiving as an input a mixture of in-phase and quadrature (I/Q) signals and mapping the I/Q signals onto a neural network to determine complex-valued output weights of neural states of the neural network;
    a global learning layer, the global learning layer operable for adapting the complex-valued output weights to predict a most likely next value of the input I/Q signal;
    a neural combiner, the neural combiner operable for combining a set of delayed neural state vectors with the weights of the global learning layer to compute an output signal, the output signal being separate in-phase and quadrature signals; and
    wherein the NeurACore CSP is implemented as a Wide Instantaneous Bandwidth (WIB) NeurACore by incorporating a process that includes an adaptive core equation, output layer update equations, and weights update equations.

2. The NeurACore CSP as set forth in claim 1, wherein in the output layer update equations, an output is created after an elementwise multiplication between weights (C) and states (X), a size of which is determined by a systems embedding factor (K).

3. The NeurACore CSP as set forth in claim 2, wherein the output layer update equation is modified to represent hardware delays.

4. A Neuromorphic Adaptive Core (NeurACore) cognitive signal processor (CSP) for wide instantaneous bandwidth denoising of noisy signals, comprising:
    a NeurACore block, the NeurACore block being operable for receiving as an input a mixture of in-phase and quadrature (I/Q) signals and mapping the I/Q signals onto a neural network to determine complex-valued output weights of neural states of the neural network;
    a global learning layer, the global learning layer operable for adapting the complex-valued output weights to predict a most likely next value of the input I/Q signal;

a neural combiner, the neural combiner operable for combining a set of delayed neural state vectors with the weights of the global learning layer to compute an output signal, the output signal being separate in-phase and quadrature signals; and wherein the NeurACore block includes nodes that are operable as resonators and oscillators with a tunable frequency and tunable quality factor to denoise radio frequency and acoustic signals.

5. A Neuromorphic Adaptive Core (NeurACore) cognitive signal processor (CSP) for wide instantaneous bandwidth denoising of noisy signals, comprising:

a NeurACore block, the NeurACore block being operable for receiving as an input a mixture of in-phase and quadrature (I/Q) signals and mapping the I/Q signals onto a neural network to determine complex-valued output weights of neural states of the neural network;

a global learning layer, the global learning layer operable for adapting the complex-valued output weights to predict a most likely next value of the input I/Q signal;

a neural combiner, the neural combiner operable for combining a set of delayed neural state vectors with the weights of the global learning layer to compute an output signal, the output signal being separate in-phase and quadrature signals; and wherein the NeurACore block is configured to handle both real and complex-valued I/Q signals, with the CSP operable with matrices A and B as follows:

$$\begin{bmatrix} \dot{X}_I \\ \dot{X}_Q \end{bmatrix} = \underline{A} = \begin{bmatrix} X_I \\ X_Q \end{bmatrix} + \underline{B}_I u_I + \underline{B}_Q u_Q,$$

where X denotes a neural state space vector, and where I and Q subscripts denote I and Q channels of input u.

6. A computer program product for wide instantaneous bandwidth denoising of noisy signals, comprising:

a non-transitory computer readable medium having executable instructions encoded thereon, such that upon execution of the instructions, one or more processors perform operations of:

receiving as an input a mixture of in-phase and quadrature (I/Q) signals and mapping the I/Q signals onto a neural network to determine complex-valued output weights of neural states of the neural network;

adapting the complex-valued output weights to predict a most likely next value of the input I/Q signal;

combining a set of delayed neural state vectors with the weights of the global learning layer to compute an output signal, the output signal being separate in-phase and quadrature signals; and wherein mapping the I/Q signals onto a neural network to determine complex-valued output weights of neural states of the neural network incorporates a process that includes an adaptive core equation, output layer update equations, and weights update equations.

7. The computer program product as set forth in claim 6, wherein in the output layer update equations, an output is created after an elementwise multiplication between weights (C) and states (X), a size of which is determined by a systems embedding factor (K).

8. The computer program product as set forth in claim 7, wherein the output layer update equation is modified to represent hardware delays.

9. A computer program product for wide instantaneous bandwidth denoising of noisy signals, comprising:

a non-transitory computer readable medium having executable instructions encoded thereon, such that upon execution of the instructions, one or more processors perform operations of:

receiving as an input a mixture of in-phase and quadrature (I/Q) signals and mapping the I/Q signals onto a neural network to determine complex-valued output weights of neural states of the neural network;

adapting the complex-valued output weights to predict a most likely next value of the input I/Q signal;

combining a set of delayed neural state vectors with the weights of the global learning layer to compute an output signal, the output signal being separate in-phase and quadrature signals; and wherein the neural network includes nodes that are operable as resonators and oscillators with a tunable frequency and tunable quality factor to denoise radio frequency and acoustic signals.

10. A method for wide instantaneous bandwidth denoising of noisy signals, comprising acts of:

causing one or more processors perform operations of:

receiving as an input a mixture of in-phase and quadrature (I/Q) signals and mapping the I/Q signals onto a neural network to determine complex-valued output weights of neural states of the neural network;

adapting the complex-valued output weights to predict a most likely next value of the input I/Q signal;

combining a set of delayed neural state vectors with the weights of the global learning layer to compute an output signal, the output signal being separate in-phase and quadrature signals; and wherein mapping the I/Q signals onto a neural network to determine complex-valued output weights of neural states of the neural network incorporates a process that includes an adaptive core equation, output layer update equations, and weights update equations.

11. The method as set forth in claim 10, wherein in the output layer update equations, an output is created after an elementwise multiplication between weights (C) and states (X), a size of which is determined by a systems embedding factor (K).

12. The method as set forth in claim 11, wherein the output layer update equation is modified to represent hardware delays.

13. A method for wide instantaneous bandwidth denoising of noisy signals, comprising acts of:

causing one or more processors perform operations of:

receiving as an input a mixture of in-phase and quadrature (I/Q) signals and mapping the I/Q signals onto a neural network to determine complex-valued output weights of neural states of the neural network;

adapting the complex-valued output weights to predict a most likely next value of the input I/Q signal;

combining a set of delayed neural state vectors with the weights of the global learning layer to compute an output signal, the output signal being separate in-phase and quadrature signals; and wherein the neural network includes nodes that are operable as resonators and oscillators with a tunable frequency and tunable quality factor to denoise radio frequency and acoustic signals.

* * * * *